US012606492B2

(12) United States Patent
Sumino et al.

(10) Patent No.: US 12,606,492 B2
(45) Date of Patent: Apr. 21, 2026

(54) CRYSTALLINE SILICON CARBIDE FIBER AND METHOD FOR MANUFACTURING SAME, AND CERAMIC COMPOSITE SUBSTRATE

(71) Applicant: UBE CORPORATION, Ube (JP)

(72) Inventors: Mao Sumino, Ube (JP); Kouichirou Suyama, Ube (JP); Hideki Ozawa, Ube (JP); Aki Ino, Ube (JP); Tsutomu Kodama, Ube (JP); Hiroyuki Yamaoka, Ube (JP)

(73) Assignee: UBE CORPORATION, Ube (JP)

( * ) Notice: Subject to any disclaimer, the term of this patent is extended or adjusted under 35 U.S.C. 154(b) by 499 days.

(21) Appl. No.: 18/077,636

(22) Filed: Dec. 8, 2022

(65) Prior Publication Data

US 2023/0183140 A1 Jun. 15, 2023

(30) Foreign Application Priority Data

Dec. 13, 2021 (JP) ................................. 2021-201482

(51) Int. Cl.
*C04B 35/622* (2006.01)
*C04B 35/80* (2006.01)

(52) U.S. Cl.
CPC ........ *C04B 35/62281* (2013.01); *C04B 35/80* (2013.01); *C04B 2235/5244* (2013.01); *C04B 2235/656* (2013.01); *C04B 2235/658* (2013.01); *C04B 2235/662* (2013.01); *C04B 2235/785* (2013.01); *C04B 2235/9607* (2013.01)

(58) Field of Classification Search
None
See application file for complete search history.

(56) References Cited

U.S. PATENT DOCUMENTS

| | | | |
|---|---|---|---|
| 5,366,943 A | 11/1994 | Lipowitz et al. | |
| 2017/0088674 A1 | 3/2017 | Zhang et al. | |
| 2018/0087157 A1* | 3/2018 | Harrison | C04B 35/62231 |

FOREIGN PATENT DOCUMENTS

| | | |
|---|---|---|
| EP | 3 835 466 A1 | 6/2021 |
| JP | S57-106718 A | 7/1982 |
| JP | 3417459 B2 | 6/2003 |
| WO | 2020/032067 A1 | 2/2020 |

OTHER PUBLICATIONS

English translation of Hideki et al. (WO 2020/032067) (Year: 2020).*
English translation of Tatsuhiro (JP 2017/043518) (Year: 2017).*
English translation of Hiroyuki et al. (JP 2003/113537) (Year: 2003).*
English translation of Hiroko et al. (JP 2006-206376) (Year: 2006).*

(Continued)

*Primary Examiner* — Ronak C Patel
(74) *Attorney, Agent, or Firm* — Oliff PLC

(57) ABSTRACT

Provided is a crystalline silicon carbide fiber containing silicon carbide, boron nitride, and zirconium carbide and having a content of Si of 64% by weight or more and a content of C of 28% by weight or more, in which the average particle size of SiC crystal grains is 100 nm or more.

13 Claims, 3 Drawing Sheets

(56)           References Cited

OTHER PUBLICATIONS

Kumagawa et al., "Thermal Stability and Chemical Corrosion Resistance of Newly Developed Continuous Si—Zr—C—O Tyranno Fiber", Ceramic Engineering & Science Proceedings, vol. 18, (1997), pp. 113-118.
Apr. 13, 2023 extended Search Report issued in European Patent Application No. 22212764.9.
Binner, J. et al., "Selection, processing, properties and applications of ultra-high temperature ceramic matrix composites, UHTCMCs—a review," International Materials Reviews, Sep. 16, 2019, pp. 1-56, XP055647320.

* cited by examiner

CRYSTALLINE SILICON CARBIDE FIBER AND METHOD FOR MANUFACTURING SAME, AND CERAMIC COMPOSITE SUBSTRATE

CROSS-REFERENCE TO RELATED APPLICATIONS

This application claims the benefit of priority from Japanese Patent Application No. 2021-201482, filed on Dec. 13, 2021, the entire contents of which are incorporated herein by reference.

TECHNICAL FIELD

The present disclosure relates to a crystalline silicon carbide fiber and a method for manufacturing the same, and a ceramic composite substrate.

BACKGROUND

Silicon carbide fibers have excellent heat resistance and mechanical characteristics, and therefore, those fibers have been utilized as reinforcing fibers for various materials. Silicon carbide fibers are known to include amorphous fibers and crystalline fibers, and crystalline fibers are particularly excellent in terms of mechanical characteristics. For example, in Patent Literature 1 (Japanese Patent No. 3417459), a crystalline silicon carbide fiber whose strength and elastic modulus are 2 GPa or more and 250 GPa or more, respectively, is obtained by using both aluminum and boron in combination.

In Patent Literature 2 (WO 2020/032067), a crystalline silicon carbide fiber including a compositional gradient layer in which the content of silicon carbide increases while the content of boron nitride decreases toward the depth direction has been proposed. Attempts have been made to improve the tensile strength and the tensile creep characteristics at high temperatures by providing such a compositional gradient layer on the surface part of a crystalline silicon carbide fiber. In Non-Patent Literature 1 (Ceramic Engineering & Science Proceedings vol. 18, p. 113-118 (1997)), a silicon carbide fiber including Ti has been investigated.

SUMMARY

Since crystalline carbon fibers have excellent heat resistance, these carbon fibers are useful as materials for components that are used under high temperature conditions, such as engines for automobiles and aircrafts. In such use applications, it is required for crystalline carbon fibers to have a high thermal conductivity in order to suppress the generation of thermal stress associated with sudden temperature changes. Thus, in the present disclosure, a crystalline silicon carbide fiber having a sufficiently high thermal conductivity and a method for manufacturing the same are provided. Furthermore, a ceramic composite substrate including such a crystalline silicon carbide fiber is provided.

According to an aspect of the present disclosure, there is provided a crystalline silicon carbide fiber containing silicon carbide, boron nitride, and zirconium carbide, the crystalline silicon carbide fiber having a content of Si of 64% by weight or more and a content of C of 28% by weight or more, in which an average particle size of SiC crystal grains is 100 nm or more.

In this crystalline silicon carbide fiber, the average particle size of SiC crystal grains is larger than a predetermined value. By including such large-sized SiC crystal grains, the thermal conductivity can be increased. Furthermore, in such a crystalline silicon carbide fiber, a proportion of a grain boundary phase can be reduced. Since the grain boundary phase includes, for example, components different from those of SiC crystal grains, the grain boundary phase becomes a factor for a decrease in the thermal conductivity. With regard to the above-mentioned crystalline silicon carbide fiber, the fact that the proportion of the grain boundary phase can be reduced is also considered as a factor contributing to an improvement of thermal conductivity. Incidentally, the "content of Si" according to the present disclosure is a value calculated according to the sum of the amount of simple Si substance and the amount of Si constituting Si compounds. That is, the "content of Si" is a content in terms of Si atoms. Likewise, the "content of C" according to the present disclosure is a content in terms of C atoms.

The content of Zr in the crystalline silicon carbide fiber may be 0.1% to 3.8% by weight, and the content of B may be 0.1% to 3.0% by weight. As a result, even when the particle size of the SiC crystal grains is large, mechanical characteristics such as strength can be maintained sufficiently high. The "content of Zr" according to the present disclosure is a value calculated based on the sum of the amounts of Zr constituting Zr compounds. That is, the "content of Zr" is a content in terms of Zr atoms. Likewise, the "content of B" according to the present disclosure is a content in terms of B atoms.

The content of Al in the crystalline silicon carbide fiber may be 0.1% by weight or less. As a result, the thermal conductivity of the crystalline silicon carbide fiber can be further increased. The content of Al and the content of Zr in a grain boundary phase including amorphous SiC may be each 0.1 atom % or less. As a result, the thermal conductivity of the crystalline silicon carbide fiber can be even further increased. The "content of Al" according to the present disclosure is a value calculated based on the sum of the amounts of Al constituting Al compounds. That is, the "content of Al" is a content in terms of Al atoms.

At a cut surface of the above-mentioned crystalline silicon carbide fiber, the thickness of the grain boundary phase including amorphous SiC in between two adjoining SiC crystal grains may be 1.5 nm or less. By adjusting the thickness of the grain boundary phase including amorphous SiC to a predetermined value or less in this way, the thermal conductivity of the crystalline silicon carbide fiber can be even further increased. The "grain boundary phase" according to the present disclosure means a two-particle grain boundary and does not include a grain boundary triple junction.

The thermal conductivity of the crystalline silicon carbide fiber may be larger than 65 W/mK. Such a crystalline silicon carbide fiber can be suitably used for a component that is used in an environment in which significant temperature changes occur.

The crystalline silicon carbide fiber may include a grain boundary triple junction that has a larger content of Zr than the SiC crystal grains. When such a grain boundary triple junction is included, dispersed presence of Zr in the SiC crystal grains and the grain boundary phase is suppressed. As a result, the thermal conductivity of the crystalline silicon carbide fiber can be further increased.

According to another aspect of the present disclosure, there is provided a ceramic composite substrate including a ceramic material and the above-mentioned crystalline silicon carbide fiber. Such a ceramic composite substrate has a sufficiently high thermal conductivity because the ceramic composite substrate includes the above-mentioned crystalline silicon carbide fiber.

According to another aspect of the present disclosure, there is provided a method for manufacturing a crystalline silicon carbide fiber. The manufacturing method includes: a pretreatment step of heating an amorphous silicon carbide fiber containing boron and zirconium to 1550° C. to 1850° C. in an inert gas atmosphere different from nitrogen to obtain a first heating treatment product; a calcination step of heating the first heating treatment product to 1900° C. to 2200° C. in an inert gas atmosphere to obtain a second heating treatment product containing SiC crystal grains; and an annealing step of heating the second heating treatment product to 1800° C. to 2100° C. in an inert gas atmosphere including nitrogen to obtain a crystalline silicon carbide fiber.

In the above-mentioned manufacturing method, heating is performed in the calcination step and the annealing step after the pretreatment step. As a result, SiC crystal grains are subjected to sufficient grain growth, and the grain boundaries can be made sufficiently small. Furthermore, uniformity of the grain boundary composition can be improved. In this way, a crystalline silicon carbide fiber having a higher thermal conductivity can be obtained.

The crystalline silicon carbide fiber obtainable by the above-mentioned manufacturing method may contain silicon carbide, boron nitride, and zirconium carbide and may have a content of Si of 64% by weight or more and a content of C of 28% by weight or more, and the average particle size of the SiC crystal grains may be 100 nm or more.

According to the present disclosure, a crystalline silicon carbide fiber having a sufficiently high thermal conductivity and a method for manufacturing the same can be provided. Furthermore, a ceramic composite substrate including such a crystalline silicon carbide fiber can be provided.

DETAILED DESCRIPTION

Figure 1:
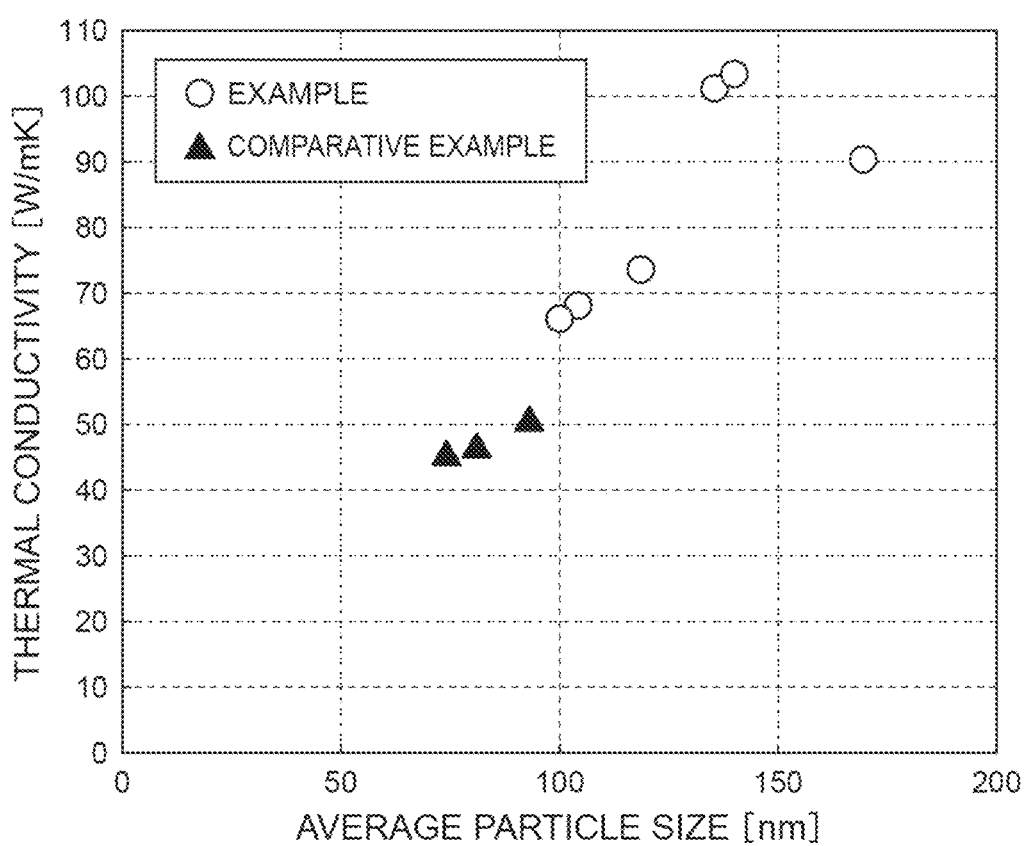
FIG. 1 is a graph showing a relationship between an average particle size and a thermal conductivity of SiC crystal grains of each of Examples and each of Comparative Examples.

Hereinafter, embodiments of the present disclosure will be described. However, the following embodiments are examples for describing the present disclosure and are not intended to limit the present disclosure to the following contents.

[Crystalline Silicon Carbide Fiber]

A crystalline silicon carbide fiber according to an embodiment contains silicon carbide and boron nitride. The crystalline silicon carbide fiber contains silicon carbide as a main component. Silicon carbide is included mainly as SiC crystal grains. Silicon carbide may be included as SiC crystal grains or may be included as an amorphous material. The shape of a cut surface orthogonally intersecting the longitudinal direction of the crystalline silicon carbide fiber may be a perfect circular shape or may be a flat shape such as an elliptic shape. The outer diameter of the cut surface may be, for example, 1 to 50 μm or may be 5 to 40 μm. When the cut surface does not have a perfect circular shape, the equivalent circle diameter may be in the above-mentioned range. The density of the crystalline silicon carbide fiber may be, for example, 2.7 to 3.3 g/cm$^3$ or may be 3.0 to 3.2 g/cm$^3$.

The average particle size of the SiC crystal grains included in the crystalline silicon carbide fiber is 100 nm or more and may be 104 nm or more. Such a crystalline silicon carbide fiber has a high thermal conductivity because the crystalline silicon carbide fiber contains SiC crystal grains having a large particle size. Furthermore, the fact that the proportion of the grain boundaries can be reduced is also considered as one of the factors contributing to an improvement of thermal conductivity. The upper limit of the average particle size of the SiC crystal grains may be, for example, 300 nm, may be 200 nm, or may be 170 nm. The average particle size of the SiC crystal grains according to the present specification can be determined by performing powder X-ray diffraction measurement using a powdered sample obtainable by pulverizing the crystalline silicon carbide fiber.

Specifically, in an XRD diffraction pattern obtainable by powder X-ray diffraction measurement, the full width at half maximum (FWHM) of the (111) peak of β-SiC is determined. Then, the average particle size D (crystallite size) of the SiC crystal grains is determined by the Sherrer Equation represented by the following Formula (1).

$$D = \frac{K\lambda}{\beta \cos\theta} \qquad (1)$$

In Formula (1), K represents the Sherrer constant; X represents the X-ray wavelength; β represents the full width at half maximum; and θ represents the angle of diffraction. In the present disclosure, the Sherrer constant is set to 0.94. As an X-ray source, CuKα radiation (wavelength: 1.5406 nm) is used.

The content of Si in the crystalline silicon carbide fiber is 64% by weight or more. The content of Si in the crystalline silicon carbide fiber may be 64% to 72% by weight, 64% to 69% by weight, 65% to 70% by weight, 64% to 68.3% by weight, or 64% to 67.9% by weight. The content of C in the crystalline silicon carbide fiber is 28% by weight or more and may be 29% by weight or more. The content of C in the crystalline silicon carbide fiber may be 28% to 36% by weight, 28% to 34% by weight, 29% to 34% by weight, 29% to 33.4% by weight, or 29% to 31.5% by weight. Most of Si and C in the crystalline silicon carbide fiber are included as SiC. However, Si and C may also be included as compounds other than SiC or as simple substances.

The content of B in the crystalline silicon carbide fiber may be 0.1% to 3.0% by weight, may be 0.1% to 2.0% by weight, may be 0.1% to 1.0% by weight, may be 0.2% to 1.0% by weight, may be 0.4% to 0.8% by weight, or may be 0.5% to 0.8% by weight. The content of Zr in the crystalline silicon carbide fiber may be 0.1% to 3.8% by weight, may be 0.2% to 3.0% by weight, may be 0.3% to 2.0% by weight, may be 0.4% to 1.0% by weight, or may be 0.7% to 0.8% by weight. By containing B and Zr in the above-mentioned ranges, mechanical characteristics such as strength of the crystalline silicon carbide fiber can be maintained sufficiently high.

The content of Al in the crystalline silicon carbide fiber may be 0.1% by weight or less, may be 0.08% by weight or less, may be 0.05% by weight or less, or may be 0.04% by weight or less. By reducing the content of Al as such, the thermal conductivity of the crystalline silicon carbide fiber can be sufficiently increased. The crystalline silicon carbide fiber does not have to include Al.

The content of N in the crystalline silicon carbide fiber may be 0.1% to 4.0% by weight, may be 0.3% to 3.0% by weight, may be 0.4% to 2.0% by weight, may be 0.5% to 1.5% by weight, or may be 1.0% to 1.3% by weight. N may be included in the crystalline silicon carbide fiber as, for example, boron nitride. The content of O (oxygen) in the crystalline silicon carbide fiber may be 0.5% by weight or less, may be 0.1% by weight or less, or may be 0.03% by weight or less. The crystalline silicon carbide fiber may also include elements other than these elements. Incidentally, the "content of N" and the "content of 0" are also a content in terms of nitrogen atoms and a content in terms of oxygen atoms, respectively, similarly to other atoms.

With regard to the crystalline silicon carbide fiber, when a cut surface orthogonally intersecting the longitudinal direction is viewed by TEM, the crystalline silicon carbide fiber contains a plurality of SiC crystal grains, a grain boundary phase in between two adjoining SiC crystal grains, and a grain boundary triple junction. The grain boundary phase contains, for example, amorphous SiC. The content of Al in the grain boundary phase may be 0.1 atom % or less, may be 0.08 atom % or less, may be 0.05 atom % or less, may be 0.03 atom % or less, or may be 0.02 atom % or less. By reducing the content of Al in the grain boundary phase as such, the thermal conductivity of the crystalline silicon carbide fiber can be sufficiently increased.

The content of Zr in the grain boundary phase may be lower than the content of Zr in the SiC crystal grains. For example, the content of Zr in the grain boundary phase may be 0.1 atom % or less, may be 0.08 atom % or less, may be 0.05 atom % or less, or may be 0.02 atom % or less. The grain boundary phase does not have to include Zr. By reducing the content of Zr in the grain boundary phase as such, the thermal conductivity of the crystalline silicon carbide fiber can be sufficiently increased. By lowering the contents of both Al and Zr in the grain boundary phase, the thermal conductivity can be further increased.

The content of Si in the grain boundary phase may be 25 atom % to 40 atom %, may be 28 atom % to 35 atom %, or may be 32 atom % to 34 atom %. The content of C in the grain boundary phase may be 59 atom % to 72 atom %, may be 60 atom % to 68 atom %, or may be 62 atom % to 65 atom %. The contents of each element in the SiC crystal grains, the grain boundary phase, and the grain boundary triple junction can be measured by energy-dispersive X-ray spectroscopy (EDS).

The thickness of the grain boundary phase measured by observing the cut surface by TEM may be 1.5 nm or less, may be 1.4 nm or less, or may be 1.3 nm or less. By reducing the thickness of the grain boundary phase as such, the thermal conductivity can be further increased. The lower limit of the thickness of the grain boundary phase may be, for example, 0.2 nm or may be 0.6 nm. An example of the thickness of the grain boundary phase is 0.2 to 1.5 nm.

The grain boundary triple junction may include a grain boundary triple junction (a) containing Zr (zirconium carbide) as a main component and a grain boundary triple junction (b) containing carbon as a main component. The content of Zr in the grain boundary triple junction (a) may be 10 atom % to 40 atom %, may be 15 atom % to 30 atom %, may be 20 atom % to 28 atom %, or may be 22 atom % to 27 atom %. When such a grain boundary triple junction (a) is included, dispersed presence of Zr in the SiC crystal grains and the grain boundary phase is suppressed. As a result, the thermal conductivity of the crystalline silicon carbide fiber can be further increased.

The content of C in the grain boundary triple junction (a) may be 40 atom % to 68 atom %, may be 45 atom % to 65 atom %, or may be 50 atom % to 58 atom %. As a result, a grain boundary triple junction (a) including ZrC can be stably formed. The content of Al in the grain boundary triple junction (a) may be 1 atom % or less or may be 0.5 atom % or less.

The content of C in the grain boundary triple junction (b) may be 80 atom % or more, may be 85 atom % or more, may be 90 atom % or more, or may be 90 atom % to 99.5 atom %. Both of the contents of Zr and Al in the grain boundary triple junction (b) may be 0.5 atom % or less, may be 0.1 atom % or less, or may be 0.05 atom % or less. The grain boundary triple junction (b) does not have to include at least one of Zr and Al.

The thermal conductivity of the crystalline silicon carbide fiber may be, for example, larger than 65 W/mK or may be larger than 70 W/mK. The thermal conductivity of the present disclosure can be determined by the following Formula (2).

$$\text{Thermal conductivity} = \text{Thermal diffusivity}(a) \times \text{specific heat capacity}(c) \times \text{density}(d) \tag{2}$$

The thermal diffusivity (a) is measured by a light flash method.

The light flash method is a technique for measuring the thermal diffusivity in the fiber axis (longitudinal) direction of a fibrous sample. In the light flash method, when a sample is subjected to alternating heat by irradiating the top face of the sample with light, periodical temperature changes occur in the sample, and a temperature wave is formed. At this time, the alternating temperature amplitude $T(x)$ and the phase $\theta(x)$ at a distance x [in] from the heating position are represented by Formula (3) and Formula (4).

$$T(x) = T_0 \exp(-k_a x)$$

$$Ka = \ln(Tx/To)/x$$

$$\theta(x) = -k_p x + \theta_0 \tag{3}$$

$$kp = (\theta x - \theta o)/x \tag{4}$$

Here, $T_0$ and $\theta_0$ are constants defined by the amount, length, and position of the measurement sample; $k_a$ represents the attenuation constant of the amplitude; and $k_p$ represents the change rate of phase. $T_0$ is, for example, 72 to 250, and $\theta_0$ is, for example, 2.1 to 3.8.

The thermal diffusivities $\alpha_a$ and $\alpha_p$ are represented by the following Formula (5) and Formula (6).

$$\alpha_a = \frac{\omega}{2k_a^2} \tag{5}$$

$$\alpha_p = \frac{\omega}{2k_p^2} \tag{6}$$

Here, $\omega$ represents the angular frequency determined from the frequency f [Hz] of light irradiation ($\omega = 2\pi f$). In the present disclosure, it is defined that f =10 Hz. Thermal diffusivities $\alpha_a$ and $\alpha_p$ area determined by substituting $k_a$ and $k_p$, which are determined by Formula (3) and Formula (4), into Formula (5) and Formula (6). The thermal diffusivities $a_a$ and $a_p$ are apparent values affected by thermal loss and the like. The true thermal diffusivity (α) is a geometric mean of these and can be determined by Formula (7).

$$\alpha = \sqrt{\alpha_a \alpha_p} \qquad (7)$$

The specific heat capacity (c) can be determined by a DSC method. Specifically, an appropriate amount of the crystalline silicon carbide fiber is collected in a DSC sample container, and measurement can be made based on JIS R 1672:2006.

The density (d) is measured by using a He pycnometer. Specifically, an appropriate amount of the crystalline silicon carbide fiber is collected, and measurement can be made based on JIS Z 8837:2018.

The tensile strength (20° C.) of the crystalline silicon carbide fiber may be 3 GPa or greater or may be 3.2 GPa or greater. The tensile modulus (20° C.) of the crystalline silicon carbide fiber may be 300 GPa or greater or may be 330 GPa or greater.

[Ceramic Composite Substrate]

A ceramic composite substrate according to an embodiment contains a ceramic material and a crystalline silicon carbide fiber.

Specifically, the ceramic composite substrate contains a ceramic material as a matrix and a crystalline silicon carbide fiber that reinforces the ceramic material (matrix). In the ceramic composite substrate, the crystalline silicon carbide fiber may be dispersed in the ceramic material. In the ceramic composite substrate, the crystalline silicon carbide fiber may be included as a two-dimensional woven fabric such as a plain weave or a satin weave, or a three-dimensional woven fabric. Furthermore, the crystalline silicon carbide fiber may be included as a sheet-like nonwoven fabric or may be included as a laminate of those nonwoven fabrics.

Examples of the ceramic material as a matrix include crystalline and amorphous oxide ceramic materials, crystalline and amorphous non-oxide ceramic materials, glass, and crystallized glass. The ceramic material may include one kind or two or more kinds of these.

Specific examples of the oxide ceramic materials include oxides containing at least one selected from the group consisting of aluminum, magnesium, silicon, yttrium, indium, uranium, calcium, scandium, tantalum, niobium, neodymium, lanthanum, ruthenium, rhodium, beryllium, titanium, tin, strontium, barium, zinc, zirconium, and iron, as constituent elements.

Examples of the non-oxide ceramic materials include carbides, nitrides, and borides. Examples of the carbides include carbides containing at least one selected from the group consisting of silicon, titanium, zirconium, aluminum, uranium, tungsten, tantalum, hafnium, boron, iron, and manganese, as constituent elements. Specific examples of the carbides (composite carbides) include inorganic materials obtainable by heating and calcining polytitanocarbosilane and polyzirconocarbosilane.

Examples of the nitrides include nitrides containing at least one selected from the group consisting of silicon, boron, aluminum, magnesium, and molybdenum as constituent elements. The nitrides may be composite oxides containing these elements as constituent elements. A specific example of the composite oxides includes sialon.

Examples of the borides include borides of titanium, yttrium, and lanthanum. Specific examples include platinum group lanthanoid borides such as $CeCoB_2$, $CeCo_4B_4$, and $ErRh_4B_4$.

Examples of the glass include amorphous glasses such as silicate glasses, phosphate glasses, and borate glasses.

Examples of the crystallized glass include $LiO_2$—$Al_2O_3$—$MgO$—$SiO_2$-based glass and $LiO_2$—$Al_2O_3$—$MgO$—$SiO_2$—$Nb_2O_5$-based glass, whose main crystal phase is β-spodumene. Furthermore, examples include $MgO$—$Al_2O_3$—$SiO_2$-based glass whose main crystal phase is cordierite, $BaO$—$MgO$—$Al_2O_3$—$SiO_2$-based glass whose main crystal phase is barium osumilite, $BaO$—$Al_2O_3$—$SiO_2$-based glass whose main crystal phase is mullite or hexacelsian, and $CaO$—$Al_2O_3$—$SiO_2$-based glass whose main crystal phase is anorthite. In the crystal phases of these crystallized glasses, cristobalite may be included. The ceramic material as the matrix may be a solid solution of various above-described ceramics.

Since such a ceramic composite substrate includes the above-mentioned crystalline silicon carbide fiber, the ceramic composite substrate has a high thermal conductivity. Such a ceramic composite substrate is suitably used as a material for a component that is used in an environment in which significant temperature changes occur. The content proportions of the ceramic material and the crystalline silicon carbide fiber may be such that when the sum of the ceramic material and the crystalline silicon carbide fiber is taken as 100 parts by mass, the ceramic composite substrate may include 10 to 90 parts by mass of the crystalline silicon carbide fiber.

[Method for Manufacturing Crystalline Silicon Carbide Fiber]

An example of a method for manufacturing a crystalline silicon carbide fiber will be described below. The present example has:

a spinning step of melt-spinning a thermoplastic polymer composition including an organosilicon polymer, an organoboron compound, and an organozirconium compound to obtain a fiber;

an infusibilization step of heating the fiber in an atmosphere including oxygen to crosslink the polymer molecules;

a heating step of heating the infusibilized fiber in an inert gas at a temperature in the range of 800° C. to 1350° C. to obtain an amorphous silicon carbide fiber;

a pretreatment step of heating the amorphous silicon carbide fiber containing boron and zirconium to 1550° C. to 1850° C. in an inert gas atmosphere different from nitrogen to obtain a first heating treatment product;

a calcination step of heating the first heating treatment product to 1900° C. to 2200° C. in an inert gas atmosphere to obtain a second heating treatment product containing SiC crystal grains and a grain boundary phase including amorphous SiC; and an annealing step of heating the second heating treatment product to 1800° C. to 2100° C. in an inert gas atmosphere including nitrogen to obtain a crystalline silicon carbide fiber.

The organosilicon polymer used in the spinning step can be prepared by, for example, the following procedure. First, one or more kinds of dichlorosilanes are subjected to a dechlorination reaction using sodium, and thereby a chain-like or cyclic polysilane is prepared. The number average molecular weight of the polysilane is, for example, 300 to 1000. The chain-like or cyclic polysilane may be a polysilane having a carbosilane bond, which is obtainable by heating or by a reaction. Such a polysilane may be obtained by heating a chain-like or cyclic polysilane to a temperature in the range of 400° C. to 700° C. or may be obtained by adding a phenyl group-containing polyborosiloxane to the chain-like or cyclic polysilane and heating the mixture to a temperature in the range of 250° C. to 500° C. The polysilane may have a hydrogen atom, a lower alkyl group, an aryl group, a phenyl group, or a silyl group in a side chain.

The phenyl group-containing polyborosiloxane can be prepared by a dechlorination condensation reaction between boric acid and one or more kinds of diorganochlorosilane. The number average molecular weight thereof is, for example, 500 to 10,000.

The organoboron compound may be a boric acid ester from the viewpoint of accelerating the condensation reaction with the organosilicon compound. The boric acid ester may include a boric acid ester formed from boric acid and a higher alcohol having 6 or more carbon atoms. Examples of the boric acid ester include triphenyl borate, trihexyl borate, tricyclohexyl borate, trioctyl borate, triisooctyl borate, trinonyl borate, tridecyl borate, tridodecyl borate, and trioctadecyl borate.

The organozirconium compound may be an alkoxide of zirconium, an acetylacetonate compound of zirconium, a carbonyl compound of zirconium, a cyclopentadienyl compound of zirconium, or the like. The organozirconium compound may include an acetylacetonate compound from the viewpoint of facilitating the introduction into the polymer skeleton. An organosilicon polymer, an organoboron compound, and an organozirconium compound are blended to prepare a thermoplastic polymer composition. The blending amount of the organoboron compound with respect to 100 parts by weight of the organosilicon polymer may be 10 to 50 parts by weight or may be 20 to 40 parts by weight. The blending amount of the organozirconium compound with respect to 100 parts by weight of the organosilicon polymer may be 1 to 10 parts by weight or may be 2 to 8 parts by weight. Such a thermoplastic polymer composition is heated to, for example, 150° C. to 300° C. to melt and is spun.

In the infusibilization step, the spun fiber obtained in the spinning step is heated for 1 to 10 hours at a temperature of 250° C. to 350° C. in an atmosphere including oxygen (for example, air) to crosslink the polymer molecules. As a result, the polymer is infusibilized.

In the heating step, the infusibilized fiber is subjected to a heating treatment for 10 seconds to 10 hours at a temperature of 800° C. to 1350° C., for example, in an inert atmosphere such as nitrogen gas or argon gas. As a result, an amorphous silicon carbide fiber containing boron and zirconium is obtained. Boron and zirconium may be included as compounds in the amorphous silicon carbide fiber.

In the pretreatment step, the amorphous silicon carbide fiber is heated to 1550° C. to 1850° C. in an inert gas atmosphere different from nitrogen to obtain a first heating treatment product. With such a pretreatment step, the amorphous silicon carbide fiber can be converted into a microcrystalline state. The heating treatment time in the pretreatment step is, for example, 10 seconds to 10 hours.

In the calcination step, the amorphous silicon carbide fiber is heated to 1900° C. to 2200° C. in an inert gas atmosphere such as nitrogen gas or argon gas to obtain a second heating treatment product containing SiC crystal grains. The temperature for heating may be 1950° C. to 2200° C. or may be 1950° C. to 2100° C. In the calcination step, crystallization of the silicon carbide fiber proceeds. As a result, the SiC crystal grains undergo grain growth. The heating time in the calcination step is, for example 10 seconds to 10 hours. The heating time of the calcination step may be shorter than the heating time of the pretreatment step.

In the annealing step, the second heating treatment product is heated to 1800° C. to 2100° C. As a result, components such as zirconium migrate from the SiC crystal grains while promoting grain growth of the SiC crystal grains by using the grain boundary components. Such zirconium becomes carbide and is precipitated into the grain boundary triple junctions. In this way, a crystalline silicon carbide fiber having a content of Si of 64% by weight or more and a content of C of 28% by weight or more and having an average particle size of SiC crystal grains of 100 nm or more can be manufactured. In the crystalline silicon carbide fiber obtainable in this way, metal components such as zirconium in the SiC crystal grains and the grain boundaries are reduced. Furthermore, since a crystalline silicon carbide fiber is manufactured without using an organoaluminum compound, the content of aluminum can be reduced. The heating temperature for the second heating treatment product may be 1950° C. to 2100° C. The crystalline silicon carbide fiber obtainable in this way may have the same structure and composition as the aforementioned embodiment of the crystalline silicon carbide fiber. Incidentally, the method for manufacturing the crystalline silicon carbide fiber is not limited to the above-mentioned method, and the crystalline silicon carbide fiber may be manufactured by other methods.

[Method for Manufacturing Ceramic Composite Substrate]

A ceramic composite substrate can be manufactured by, for example, the following procedure. The crystalline silicon carbide fiber obtained by the above-mentioned manufacturing method is woven to produce a preform (woven fabric). This preform is impregnated with a slurry including a raw material powder of a ceramic material that serves as a matrix. A molding raw material obtained in this way is sintered by pressurizing the molding raw material at a high temperature by hot pressing or the like. As a result, the ceramic composite substrate can be obtained.

The method for manufacturing the ceramic composite substrate is not limited to the above-mentioned method, and the ceramic composite substrate may be manufactured by, for example, a polymer impregnation and calcination method. In this case, a solution is prepared by dissolving polycarbosilane, polymetallocarbosilane, polysilazane, or the like in a solvent such as xylene. A preform is impregnated with this solution and then dried to obtain a precursor. This precursor is subjected to compositization by heating and calcining the precursor, and the ceramic composite substrate can be obtained.

As a manufacturing method other than the above-mentioned method, a sol-gel method of using alkoxides of the constituent elements of the ceramic material that serves as a matrix, as raw materials; a chemical vapor phase deposition method of producing a ceramic material that serves as a matrix by a reaction of reactive gases at a high temperature; a reaction sintering method of impregnating molten metals at a high temperature and ceramicizing the metals by a reaction; and the like can be utilized. Furthermore, it is also acceptable that a portion of a ceramic material that serves as a matrix is formed by a chemical vapor phase deposition method, and then the remaining space is densified by using a reaction sintering method or a polymer impregnation and calcining method.

As described above, embodiments of the present disclosure have been described; however, the present disclosure is not intended to be limited to the above-described embodiments. For example, a numerical value range obtained by arbitrarily combining the upper limit value and the lower limit value of the numerical value range specifically described in the embodiments, is also included in the present disclosure. Furthermore, a numerical value range obtained by substituting the upper limit value and/or lower limit value with values shown in the Examples that will be described below, is also included in the present disclosure.

EXAMPLES

The contents of the present disclosure will be described in more detail with reference to Examples and Comparative Examples; however, the present disclosure is not intended to be limited to the following Examples.

[Preparation of Crystalline Silicon Carbide Fiber]

Example 1

A xylene solution was prepared by blending 1000 parts by weight of anhydrous xylene with 400 parts by weight of sodium. While this xylene solution was heated to reflux under a nitrogen gas stream, 1034 parts by weight of dimethyldichlorosilane was added dropwise into the xylene solution. After the dropwise addition, heating and refluxing was continued for 10 hours to produce a precipitate. After this precipitate was collected by filtration, the precipitate was sequentially washed with methanol and water. In this way, 420 parts by weight of white polydimethylsilane was obtained.

A mixed liquid was obtained by blending 750 parts of diphenyldichlorosilane and 124 parts of boric acid into 1000 parts by weight of n-butyl ether. This mixed liquid was heated to 100° C. to 120° C. in a nitrogen gas atmosphere to produce a white resinous material. This was collected by filtration and then was heated for one hour at 400° C. in a vacuum. In this way, 530 parts by weight of phenyl group-containing polyborosiloxane was obtained.

4 parts by weight of phenyl group-containing polyborosiloxane was blended with 100 parts by weight of polydimethylsilane, and the mixture was thermally condensed by heating for 5 hours at 350° C. in a nitrogen gas atmosphere. As a result, an organosilicon polymer having a high molecular weight was obtained. 100 parts by weight of this organosilicon polymer was dissolved in xylene to obtain a xylene solution. An organoboron compound and an organozirconium compound were added to this xylene solution. At this time, 30 parts by weight of the organoboron compound and 4 parts by weight of the organozirconium compound were added to 100 parts by weight of the organosilicon polymer. The obtained mixed liquid was heated at 300° C. for 9 hours under a nitrogen gas stream. Tris IsoDecyl Borate (TIDB) was used as the organoboron compound, and zirconium acetylacetonate was used as the organozirconium compound. In this way, a thermoplastic polymer composition was obtained.

The thermoplastic polymer composition was melt-spun at 245° C. (spinning step). Thereafter, the resultant was subjected to a heating treatment at 250° C. for 5 hours in air to obtain an infusibilized fiber (infusibilization step). The infusibilized fiber was continuously calcined at 1100° C. in a nitrogen gas atmosphere, and an amorphous silicon carbide fiber was obtained (heating step).

This amorphous silicon carbide fiber was heated at 1600° C. for about 2 hours in an argon gas atmosphere to obtain a first heating treatment product (pretreatment step). Thereafter, the first heating treatment product was heated at a temperature of 2000° C. for about 1 minute in an argon gas atmosphere to obtain a second heating treatment product (calcination step). In a nitrogen gas atmosphere, the second heating treatment product was heated at a temperature of 2000° C. for 2 hours to obtain a crystalline silicon carbide fiber (annealing step).

Example 2

A crystalline silicon carbide fiber was obtained in the same manner as in Example 1, except that the temperature for the pretreatment step and the calcination step and the atmosphere for the calcination step were changed as shown in Table 1.

Example 3

A crystalline silicon carbide fiber was obtained in the same manner as in Example 1, except that the temperatures for the pretreatment step and the atmosphere for the calcination step were changed as shown in Table 1.

Example 4

A crystalline silicon carbide fiber was obtained in the same manner as in Example 3, except that the temperature for the pretreatment step was changed as shown in Table 1.

Example 5

A crystalline silicon carbide fiber was obtained in the same manner as in Example 3, except that the temperature for the annealing step was changed as shown in Table 1.

Example 6

A crystalline silicon carbide fiber was obtained in the same manner as in Example 1, except that the temperature for the pretreatment step was changed as shown in Table 1.

Comparative Example 1

A xylene solution of an organosilicon polymer was obtained by the same procedure as that of Example 1. To this xylene solution, an organoboron compound and an organoaluminum compound were added. At this time, 12 parts by weight of the organoboron compound and 12 parts by weight of the organoaluminum compound were added to 100 parts by weight of the organosilicon polymer. The obtained mixed liquid was heated for 9 hours at 280° C. under a nitrogen gas stream. Tris IsoDecyl Borate (TIDB) was used as the organoboron compound, and aluminum tri(sec-butoxide) was used as the organoaluminum compound. In this way, a thermoplastic polymer composition was obtained. A crystalline silicon carbide fiber was obtained in the same manner as in Example 1, except that the thermoplastic polymer composition obtained in this manner was used, the temperature and atmosphere during the calcination step were changed as shown in Table 1, and the annealing step was not carried out.

Comparative Examples 2 and 3

A xylene solution of an organosilicon polymer was obtained by the same procedure as that of Example 1. To this xylene solution, an organoboron compound and an organozirconium compound were added. At this time, 30 parts by weight of the organoboron compound and 12 parts by weight of the organozirconium compound were added to 100 parts by weight of the organosilicon polymer. The obtained mixed liquid was heated for 9 hours at 280° C. under a nitrogen gas stream. Tris IsoDecyl Borate (TIDB) was used as the organoboron compound, and zirconium acetylacetonate was used as the organozirconium compound. A crystalline silicon carbide fiber was obtained in the same manner as in Example 1, except that a thermoplastic polymer composition obtained in this way was used, the temperature for the heating step and the temperature and atmosphere for the calcination step were changed as shown in Table 1, and the annealing step was not carried out.

an appropriate amount of a crystalline silicon carbide fiber was collected in a DSC sample container, and the specific heat capacity was measured based on JIS R1672:2006. As a measurement apparatus, a differential scanning calorimeter DSC8500 (apparatus name) manufactured by PerkinElmer, Inc. was used. The results are presented in Table 2.

TABLE 1

|  | Heating step | Pretreatment step | Calcination step | | | Annealing step | |
|---|---|---|---|---|---|---|---|
|  | Temperature [° C.] | Temperature [° C.] | Temperature [° C.] | Time [min] | Atmosphere | Temperature [° C.] | Time [min] |
| Example 1 | 1100 | 1600 | 2000 | 1 | Ar | 2000 | 120 |
| Example 2 | 1100 | 1800 | 2050 | 1 | $N_2$ | 2000 | 120 |
| Example 3 | 1100 | 1700 | 2000 | 1 | $N_2$ | 2000 | 120 |
| Example 4 | 1100 | 1750 | 2000 | 1 | $N_2$ | 2000 | 120 |
| Example 5 | 1100 | 1700 | 2000 | 1 | $N_2$ | 1800 | 120 |
| Example 6 | 1100 | 1700 | 2000 | 1 | Ar | 2000 | 120 |
| Comparative Example 1 | 1100 | 1600 | 1900 | 1 | $N_2$ | — | — |
| Comparative Example 2 | 1400 | 1600 | 2050 | 1 | $N_2$ | — | — |
| Comparative Example 3 | 1400 | 1600 | 2200 | 1 | $N_2$ | — | — |

[Evaluation of Crystalline Silicon Carbide Fiber]<Measurement of average particle size of SiC crystal grains>Crystalline silicon carbide fibers obtained in each Example and each Comparative Example were pulverized to obtain measurement samples. Powder X-ray diffraction measurement of these measurement samples was carried out. SiC crystal grain diameters were measured from the above-mentioned Formula (1) by using the full width at half maximum (FWHM) of the (111) peak of β-SiC in the XRD diffraction pattern obtained by the measurement. For the powder X-ray diffraction measurement, a RINT-TTR III type wide-angle X-ray diffraction apparatus (apparatus name) was used. As the X-ray source, CuKa radiation (wavelength: 1.5406 nm) was used. The results are presented in Table 2.
<Measurement of Density>
The densities of the crystalline silicon carbide fibers obtained in each Example and each Comparative Example were measured by using a He pycnometer. An appropriate amount of a measurement sample was collected, and then the density was measured based on JIS Z 8837:2018. As the measurement apparatus, Micro-ULTRA-PYC-1200e (apparatus name) manufactured by Anton Paar GmbH was used. The results are presented in Table 2.
<Measurement of Specific Heat Capacity>
The specific heat capacities of the crystalline silicon carbide fibers obtained in each Example and each Comparative Example were measured by a DSC method. Specifically, <Measurement of Thermal Diffusivity>
The thermal diffusivities of the crystalline silicon carbide fibers obtained in each Example and each Comparative Example were measured by a light flash method. The principle of measurement according to the light flash method are as described above. A crystalline silicon carbide fiber was cut to obtain a sample piece having a length of about 30 mm This sample piece was fixed to a sample holder and was used for measurement. As a measurement apparatus, a thermal diffusivity measurement apparatus LaserPIT (apparatus name) manufactured by ULVAC-RIKO, Inc. was used. The results are presented in Table 2.
<Calculation of Thermal Conductivity>
The thermal conductivity was calculated by using the values of the density, specific heat capacity, and thermal diffusivity measured by the above-mentioned procedures, and the Formula (2). The results are presented in Table 2.
<Measurement of Tensile Strength And Tensile Modulus>
A tensile strength test was performed on the crystalline silicon carbide fibers (monofilaments) obtained in each Example and each Comparative Example to measure the tensile strength and tensile modulus at room temperature (20° C.). As a measurement apparatus, a tensile strength measuring machine STB-1225S (apparatus name) manufactured by A&D Company, Limited was used. The results are presented in Table 2.

TABLE 2

|  | Average particle size [nm] | Density [Kg/m³] | Thermal characteristics | | | Mechanical characteristics | |
|---|---|---|---|---|---|---|---|
|  |  |  | Specific heat capacity [JKg⁻¹K⁻¹] | Thermal diffusivity × 10⁻⁵ [m²s⁻¹] | Thermal conductivity [Wm⁻¹K⁻¹] | Tensile strength [GPa] | Tensile modulus [GPa] |
| Example 1 | 135 | 3164 | 670 | 4.75 | 101 | 3.52 | 399 |
| Example 2 | 169 | 3163 | 667 | 4.28 | 90 | 3.23 | 371 |
| Example 3 | 104 | 3096 | 670 | 3.28 | 68 | 3.56 | 344 |
| Example 4 | 119 | 3167 | 672 | 3.45 | 74 | 3.87 | 384 |
| Example 5 | 100 | 3080 | 669 | 3.20 | 66 | 3.55 | 342 |

TABLE 2-continued

| | Average | | Specific | Thermal characteristics | | Mechanical characteristics | |
|---|---|---|---|---|---|---|---|
| | particle size [nm] | Density [Kg/m³] | heat capacity [JKg⁻¹K⁻¹] | Thermal diffusivity × 10⁻⁵ [m²s⁻¹] | Thermal conductivity [Wm⁻¹K⁻¹] | Tensile strength [GPa] | Tensile modulus [GPa] |
| Example 6 | 140 | 3170 | 670 | 4.85 | 103 | 3.75 | 386 |
| Comparative Example 1 | 74 | 3100 | 676 | 2.18 | 46 | 4.38 | 343 |
| Comparative Example 2 | 81 | 3150 | 671 | 2.22 | 47 | — | — |
| Comparative Example 3 | 93 | 3180 | 673 | 2.38 | 51 | — | — |

As shown in Table 2, the average particle size of the SiC crystal grains included in the crystalline silicon carbide fiber of each Example was 100 nm or more. FIG. 1 is a graph obtained by plotting the results of each Example (open circle) and each Comparative Example (closed triangle), with the axis of abscissa representing the average particle size and the axis of ordinate representing the thermal conductivity. As shown in FIG. 1, it was verified that as the average particle size was larger, the thermal conductivity tended to be larger.

<Compositional Analysis for Crystalline Silicon Carbide Fiber>

The crystalline silicon carbide fibers obtained in each Example and each Comparative Example were pulverized, and the content of each element was measured. For the measurement of the contents of Al, B, Zr, N, and Si, ICP-AES (manufactured by SHIMADZU CORPORATION, apparatus name: ICPE-9820 type) was used. For the measurement of the content of C (carbon), an element analyzer (trade name: TCH600 type) manufactured by LECO Corp. was used, and for the measurement of the contents of O (oxygen) and N (nitrogen), an element analyzer (trade name: CS844 type) manufactured by LECO Corp. was used. The results were as shown in Table 3. Incidentally, in Table 3, the symbol "—" indicates that the value is less than the lower detection limit (Zr: less than 0.0005% by weight).

TABLE 3

| | Composition of crystalline silicon carbide fiber [wt %] | | | | | | |
|---|---|---|---|---|---|---|---|
| | Al | B | Zr | O | C | N | Si |
| Example 1 | 0.03 | 0.57 | 0.72 | 0.02 | 29.8 | 1.00 | 67.9 |
| Example 2 | 0.01 | 0.62 | 0.72 | 0.01 | 30.5 | 1.05 | 67.1 |
| Example 3 | 0.01 | 0.74 | 0.72 | 0.03 | 31.5 | 1.20 | 65.8 |
| Example 4 | 0.01 | 0.72 | 0.71 | 0.02 | 30.3 | 1.21 | 67.0 |
| Example 5 | 0.01 | 0.66 | 0.72 | 0.02 | 33.4 | 1.12 | 64.1 |
| Example 6 | 0.01 | 0.60 | 0.71 | 0.01 | 29.3 | 1.08 | 68.3 |
| Comparative Example 1 | 0.43 | 0.57 | — | 0.03 | 31.9 | 0.35 | 66.7 |
| Comparative Example 2 | 0.01 | 0.50 | 0.45 | 0.02 | 30.2 | 0.65 | 68.2 |
| Comparative Example 3 | 0.01 | 0.20 | 0.46 | 0.03 | 30.0 | 0.25 | 69.1 |

<Compositional Analysis for SiC Crystal Grains, Grain Boundary Phase, And Grain Boundary Triple Junction>

The crystalline silicon carbide fibers obtained in Examples 1 to 3 and Comparative Example 1 were ruptured and then fixed to a sample support by using a carbon tape, and carbon vapor deposition was provided. Thereafter, the crystalline silicon carbide fibers were introduced into a Focused Ion Beam (FIB) apparatus, and in order to prevent any damage caused by FIB processing, formation of a carbon film was performed by deposition (thickness: about 1 μm). Microsampling (Cu support) was performed, and thin samples having cut surfaces for TEM observation were prepared by FIB. For the FIB, a focused ion beam apparatus XVision200TB manufactured by SII NanoTechnology Inc. was used.

After the thin samples were prepared, observation by Transmission Electron Microscopy (TEM), observation by Dark-Field Scanning Transmission Electron Microscopy (DF-STEM), and measurement by Energy Dispersive X-ray Spectroscopy (EDS) were carried out to measure the composition and the thickness of the grain boundary phase. For TEM and STEM, a field emission type transmission electron microscope (apparatus name: JEM-2100F) manufactured by JEOL Ltd. and an atomic resolution analysis electron microscope (apparatus name: JEM-ARM200F) manufactured by JEOL Ltd. were used. For EDS, a silicon drift detector (beam diameter: about 0.2 nmΦ) manufactured by JEOL Ltd. was used.

A compositional analysis was carried out for each of SiC crystal grains, a grain boundary phase in between two adjoining SiC crystal grains, and a grain boundary triple junction. An analysis of a plurality of grain boundary triple junctions at a cross-section was made, and it was found that there were a grain boundary triple junction (a) having large contents of Zr and C and a grain boundary triple junction (b) having a small content of Zr and a large content of C. The compositions of the SiC crystal grains and the grain boundaries are presented in Table 4, and the compositions of the grain boundary triple junctions (a) and (b) are presented in Table 5. Incidentally, in Table 4 and Table 5, the symbol "—" indicates that the value is less than the lower detection limit (less than 0.01 atom %), and the term "n/a" indicates that the grain boundary triple junction (a) is not included in the cut surface.

TABLE 4

| | SiC crystal grain [atom %] | | | | Grain boundary phase [atom %] | | | |
|---|---|---|---|---|---|---|---|---|
| | Al | Zr | Si | C | Al | Zr | Si | C |
| Example 1 | — | — | 34.05 | 63.30 | 0.02 | — | 32.7 | 64.7 |
| Example 2 | 0.05 | — | 35.64 | 61.52 | 0.01 | 0.02 | 32.7 | 64.2 |
| Example 3 | 0.05 | — | 35.88 | 61.54 | 0.02 | — | 32.4 | 64.9 |
| Comparative Example 1 | 0.25 | — | 41.82 | 55.91 | 0.13 | — | 40.1 | 58.0 |

TABLE 5

| | Grain boundary triple junction (a) [atom %] | | | | Grain boundary triple junction (b) [atom %] | | | |
|---|---|---|---|---|---|---|---|---|
| | Al | Zr | Si | C | Al | Zr | Si | C |
| Example 1 | 0.24 | 26.6 | 3.69 | 54.4 | 0.02 | 0.05 | 1.98 | 92.9 |
| Example 2 | 0.46 | 22.7 | 0.63 | 54.1 | — | — | 0.16 | 99.1 |
| Example 3 | 0.30 | 22.6 | 0.75 | 54.8 | — | — | 0.27 | 98.4 |
| Comparative Example 1 | | | n/a | | 0.04 | — | 0.64 | 98.3 |

As shown in Table 4 and Table 5, in the SiC crystal grains and the grain boundary phase in the crystalline silicon carbide fibers of Examples 1 to 3, Al and Zr were hardly included. Furthermore, in the grain boundary triple junction (a) in the crystalline silicon carbide fibers of Examples 1 to 3, Zr was segregated. According to the results of the compositional analysis on the grain boundary triple junction (a), it was found that at least a portion of Zr was precipitated as carbide (ZrC) in the grain boundary triple junction (a). On the other hand, in the grain boundary triple junction (b) in the crystalline silicon carbide fibers of Examples 1 to 3, Zr was hardly detected, and carbon was detected as a main component.

From these results, it was confirmed that in the crystalline silicon carbide fibers of Examples 1 to 3, the contents of metal components such as Al and Zr were sufficiently reduced in the SiC crystal grains and the grain boundary phase. Furthermore, it was confirmed that the Zr included in the organozirconium compounds used for spinning was segregated in the grain boundary triple junctions.

Figure 2:
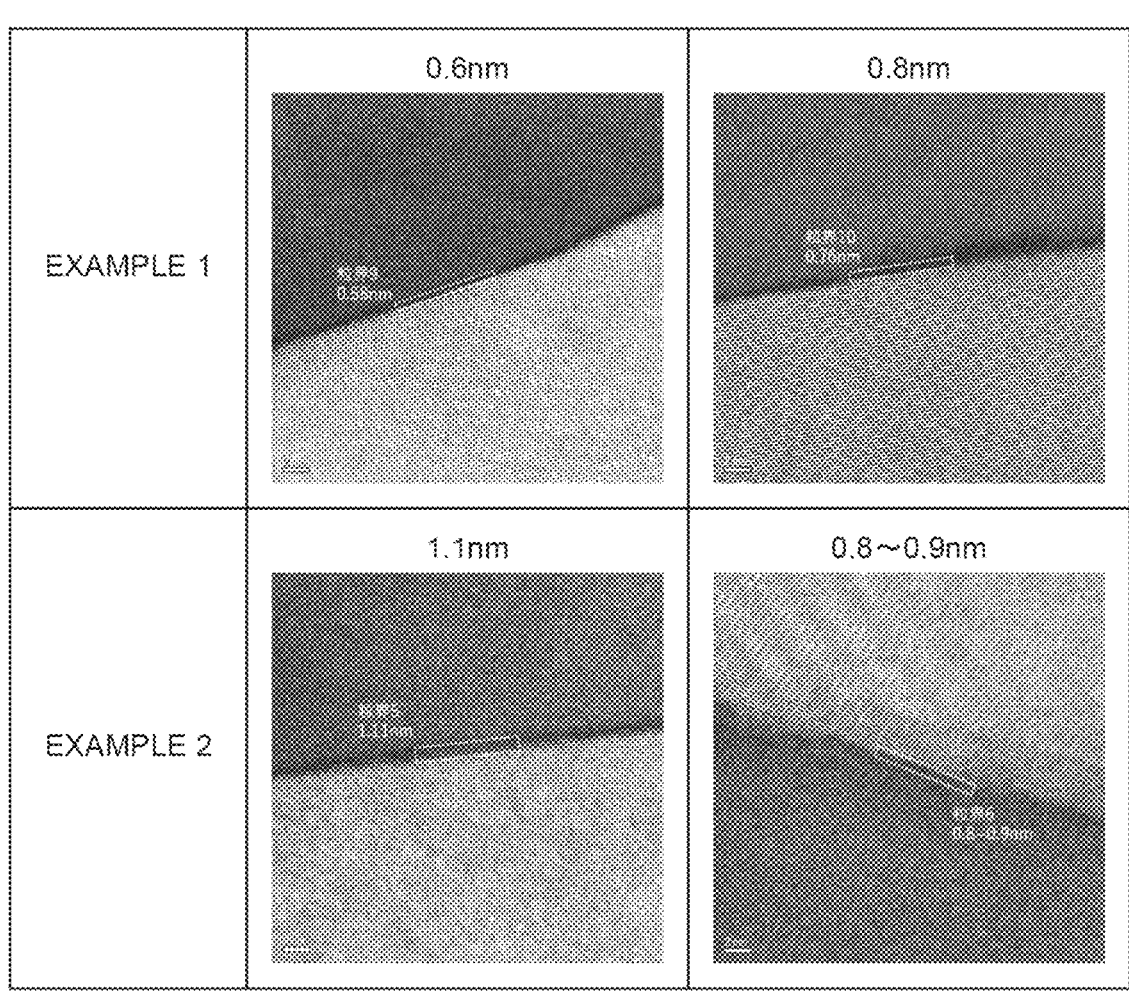
FIG. 2 is TEM photographs showing grain boundary phases at cut surfaces of crystalline silicon carbide fibers of Examples 1 and 2.
Figure 3:
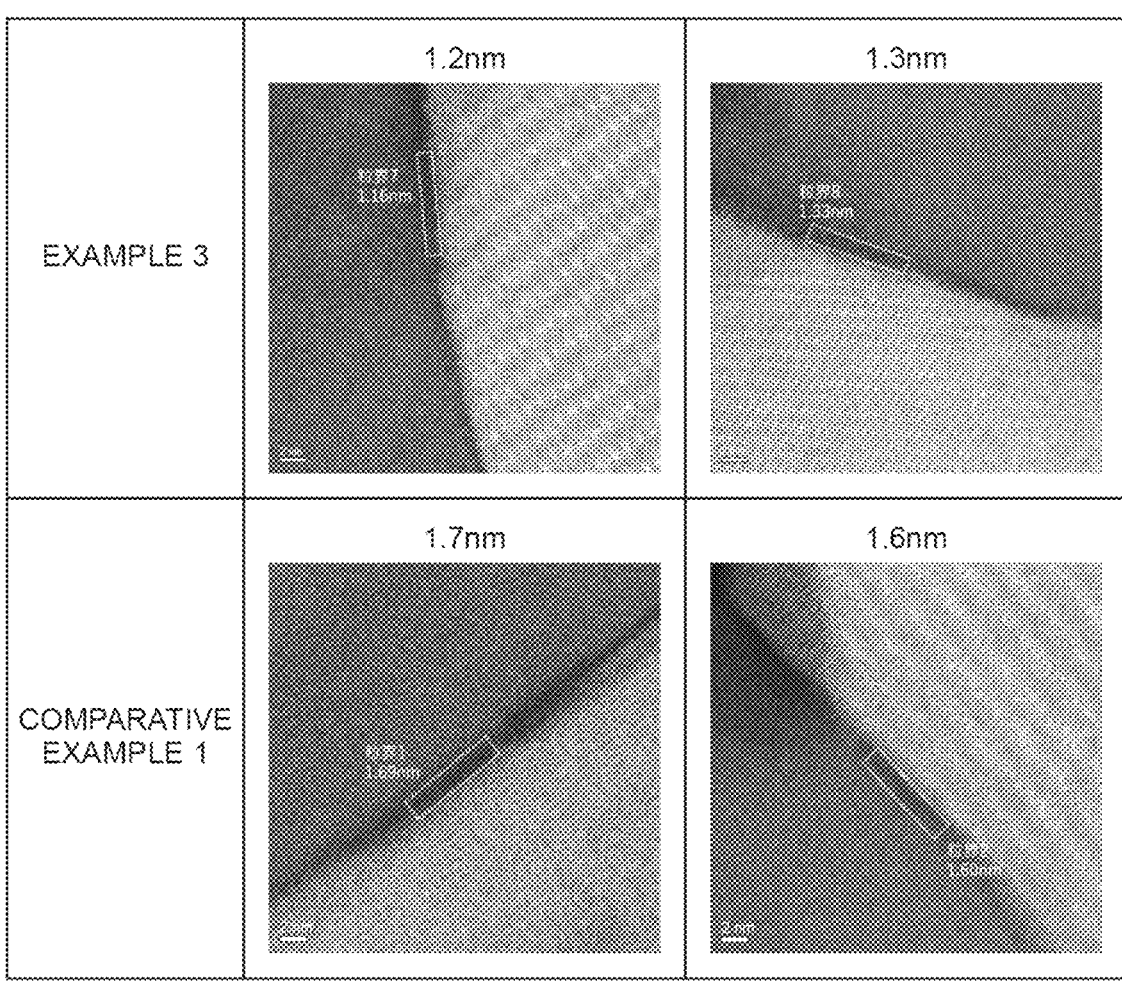
FIG. 3 is TEM photographs showing grain boundary phases at cut surfaces of crystalline silicon carbide fibers of Example 3 and Comparative Example 1.

Any two sites in the grain boundary phase in between two SiC crystal grains in a cut surface of a thin sample were selected, and the thickness of each of the sites was measured. The numerical range of these measured values were as shown in Table 6. Table 6 shows the minimum and maximum values rounded to the first decimal place. FIG. 2 is TEM photographs showing the maximum values and the minimum values of the thicknesses of the grain boundary phases of Example 1 and Example 2. FIG. 3 is TEM photographs showing the maximum values and the minimum values of the thicknesses of the grain boundary phases of Example 3 and Comparative Example 1. The thickness of the grain boundary phase was measured based on the white dotted rectangle drawn on each TEM photograph.

TABLE 6

| | Thickness of grain boundary phase [nm] |
|---|---|
| Example 1 | 0.6-0.8 |
| Example 2 | 0.8-1.1 |
| Example 3 | 1.2-1.3 |
| Comparative Example 1 | 1.6-1.7 |

As shown in Table 6, FIG. 2, and FIG. 3, it was confirmed that the thickness of the grain boundary phase in the crystalline silicon carbide fibers of Examples 1 to 3 was smaller than that of Comparative Example 1.

What is claimed is:

1. A crystalline silicon carbide fiber containing silicon carbide, boron nitride, and zirconium carbide,
the crystalline silicon carbide fiber having a content of Si of 64% by weight or more and a content of C of 28% by weight or more, wherein an average particle size of SiC crystal grains is 100 nm to 200 nm, wherein a content of Al in a grain boundary phase including amorphous SiC is 0.02 atom % to 0.1 atom % and a content of Zr in a grain boundary phase including amorphous SiC is 0.02 atom % to 0.1 atom %.

2. The crystalline silicon carbide fiber according to claim 1, wherein a content of Zr in the crystalline silicon carbide fiber is 0.1% to 3.8% by weight, and a content of B in the crystalline silicon carbide fiber is 0.1% to 3.0% by weight.

3. The crystalline silicon carbide fiber according to claim 2, wherein a content of Al in the crystalline silicon carbide fiber is 0.1% by weight or less.

4. The crystalline silicon carbide fiber according claim 2, wherein in a cut surface, a thickness of a grain boundary phase including amorphous SiC in between two adjoining SiC crystal grains is 1.5 nm or less.

5. The crystalline silicon carbide fiber according to claim 2, having a thermal conductivity larger than 65 W/mK.

6. The crystalline silicon carbide fiber according to claim 2, comprising a grain boundary triple junction having a larger content of Zr than the SiC crystal grains.

7. The crystalline silicon carbide fiber according to claim 1, wherein a content of Al in the crystalline silicon carbide fiber is 0.1% by weight or less.

8. The crystalline silicon carbide fiber according claim 1, wherein in a cut surface, a thickness of a grain boundary phase including amorphous SiC in between two adjoining SiC crystal grains is 1.5 nm or less.

9. The crystalline silicon carbide fiber according to claim 1, having a thermal conductivity larger than 65 W/mK.

10. The crystalline silicon carbide fiber according to claim 1, comprising a grain boundary triple junction having a larger content of Zr than the SiC crystal grains.

11. A ceramic composite substrate comprising a ceramic material and the crystalline silicon carbide fiber according to claim 1.

12. A ceramic composite substrate comprising a ceramic material and the crystalline silicon carbide fiber according to claim 2.

13. A method for manufacturing a crystalline silicon carbide fiber, the method comprising:
a pretreatment step of heating an amorphous silicon carbide fiber containing boron and zirconium to 1550° C. to 1850° C. in an inert gas atmosphere different from nitrogen to obtain a first heating treatment product;
a calcination step of heating the first heating treatment product to 1900° C. to 2200° C. in an inert gas atmosphere to obtain a second heating treatment product containing SiC crystal grains; and
an annealing step of heating the second heating treatment product to 1800° C. to 2100° C. in an inert gas atmosphere including nitrogen to obtain the crystalline silicon carbide fiber,
wherein the crystalline silicon carbide fiber contains silicon carbide, boron nitride, and zirconium carbide,
the crystalline silicon carbide fiber has a content of Si of 64% by weight or more and a content of C of 28% by weight or more, and
an average particle size of SiC crystal grains is 100 nm to 200 nm wherein a content of Al in a grain boundary phase including amorphous SiC is 0.02 atom % to 0.1 atom % and a content of Zr in a grain boundary phase including amorphous SiC is 0.02 atom % to 0.1 atom %.

* * * * *